United States Patent
Vainsencher et al.

(10) Patent No.: US 7,792,891 B2
(45) Date of Patent: Sep. 7, 2010

(54) FORWARD DISCRETE COSINE TRANSFORM ENGINE

(75) Inventors: Leonardo Vainsencher, San Jose, CA (US); Cahide Kiris, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 1551 days.

(21) Appl. No.: 10/316,394

(22) Filed: Dec. 11, 2002

(65) Prior Publication Data

US 2004/0117418 A1 Jun. 17, 2004

(51) Int. Cl.
*G06F 17/14* (2006.01)

(52) U.S. Cl. .................................................... 708/402
(58) Field of Classification Search ................. 708/402
See application file for complete search history.

(56) References Cited

U.S. PATENT DOCUMENTS

| | | | | |
|---|---|---|---|---|
| 4,385,363 A * | 5/1983 | Widergren et al. | .......... | 708/402 |
| 4,829,465 A * | 5/1989 | Knauer | ................. | 708/402 |
| 5,285,404 A * | 2/1994 | Satou | ................. | 708/530 |
| 5,471,412 A * | 11/1995 | Shyu | ................. | 708/402 |
| 5,659,362 A * | 8/1997 | Kovac et al. | ............. | 348/384.1 |
| 5,712,809 A * | 1/1998 | Girod et al. | ................. | 708/402 |
| 5,734,755 A | 3/1998 | Ramchandran et al. | | |
| 5,822,003 A * | 10/1998 | Girod et al. | ............ | 375/240.12 |
| 6,029,185 A * | 2/2000 | Tonomura | ................. | 708/402 |
| 6,160,920 A * | 12/2000 | Shyu | ................. | 382/250 |
| 6,189,021 B1 * | 2/2001 | Shyu | ................. | 708/401 |
| 6,223,195 B1 * | 4/2001 | Tonomura | ................. | 708/402 |
| 6,445,829 B1 * | 9/2002 | Shyu | ................. | 382/250 |
| 7,007,054 B1 * | 2/2006 | Brady et al. | ................ | 708/402 |
| 7,142,720 B1 * | 11/2006 | Fukuda et al. | .............. | 382/232 |

* cited by examiner

*Primary Examiner*—David H Malzahn

(57) ABSTRACT

Systems and methods are disclosed to perform fast discrete cosine transform (DCT) by computing the DCT in five stages using three coefficients, and scaling the outputs using a plurality of scaling coefficients.

25 Claims, 8 Drawing Sheets

(*) Those multiplications are deferred to the quantization stage

| Processing State1/State9 (Y4 out) | Processing State2/State10 (Y2 out) | Processing State3/State11 (Y6 out) | Processing State4/State12 (Y5 out) | Processing State5/State13 (Y1 out) | Processing State6/State14 (Y7 out) | Processing State7/State15 (Y3 out) | Processing State8 (Y0 out) |
|---|---|---|---|---|---|---|---|
| B1X0=X0+X7 | | | | B2X0=B1X0-B1X3 | | | |
| Y4=B2X0-B2X1 | B1X1=X1+X6 | | | B2X1=B1X1+B1X2 | | | Y0=B2X0+B2X1 |
| IB4X2=B3X2*C2 | Y2=IB4X2-B2X3 | B1X2=X2+X5 | | | B2X2=B1X1-B1X2 | B3X2=B2X2+B2X3 | |
| | B4X4=B3X4*C3 | Y6=(B2X3-IB4X2) | B1X3=X3+X4 | | B2X3=B1X0-B1X3 | | |
| B3X4=B2X4*C1+B2X | | B4X6=B3X6*C3 | B1X4=X4-X3 | | | B2X4=B1X4-B1X5 | B3X5=B2X5*C2 |
| | B1X6=X1-X6 | B1X5=X2-X5 | B2X5=B1X5+B1X6 | Y1=B4X5-B4X6 | Y7=B4X5-B4X6 | | B2X6=B1X6+B1X7 |
| B1X7=X0-X7 | | B4X7=HB1X7-B3X5 | B4X5=B3X5+HB1X7 | HB1X7=B1X7 | | Y3=B4X4+B4X7 | |
| | B3X6=B2X6*C1-B2X4 | | Y5=B4X7-B4X4 | | | | |
| B1X0=(13+4) bits | B1X1=(13+4) bits | B1X2=(13+4) bits | B1X3=(13+4) bits | B2X0=(14+4) bits | B2X2=(14+4) bits | B3X2=(15+4) bits | B2X6=(14+4) bits |
| Y4=(15+4) bits | Y2=(15+4) bits | Y6=(14+4) bits | B1X4=(14+4) bits | B2X1=(14+4) bits | B2X3=(14+4) bits | B2X4=(14+4) bits | Y0=(15+4) bits |
| IB4X2=(14+4) bits | B4X4=(14+4) bits | B4X6=(14+4) bits | B4X5=(14+4) bits | Y1=(15+4) bits | Y7=(13+4) bits | | B3X5=(13+4) bits |
| B3X4=(16+4) bits | B1X6=(13+4) | B1X5=(13+4) bits | Y5=(14+4) bits | | | Y3=(15+4) bits | IB3X4=(15+4) bits |
| IB3X6=(15+4) bits | B3X6=(16+4) bits | B4X7=(14+4) bits | B2X5=(14+4) bits | | | | |
| B1X7=(13+4) bits | | | | | | | |

*FIG. 2F*

FORWARD DISCRETE COSINE TRANSFORM ENGINE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention relates to encoding of visual images.

Wireless data services now enable a new generation of high-performance, low-power-consumption mobile devices to access network-centric applications and content anywhere, anytime. Handheld devices include personal digital assistants (PDAs), email companions, and other data-centric mobile products such as Palm OS, Symbian, and Pocket PC products. The main functionality of such devices has been for personal information manager (PIM) applications. But as more of these devices get network connectivity options, applications such as voice and email are becoming important. Additionally, next-generation mobile phones are hybrid devices that extend the voice-centric nature of current generation (2G) handsets. These devices are connected to packet-based networks, which deliver data-services in addition to voice-services. Handsets connected to 2.5G networks such as GPRS and PHS allow always-on data network connection. This enables further proliferation of multimedia- and graphics-based applications in the consumer segment of this market. 3G Handsets have been designed from the ground up to interface to high-speed, packet-based networks that deliver speeds from 20 Kbps to 2 Mbps. These handsets, in addition to the features of 2.5G phones, have the capability to support 2-way video, share pictures and video clips, use location-based information, provide a rich web experience and support next-generation server-based applications for business like always-on email.

As mobile applications become richer and more complex, the ability to optimally process multimedia becomes a necessity on mobile devices such as PDAs and smart phones. Applications such as video mail, mapping services, reading PDF files, and graphics-rich games all require high performance graphics and multimedia capabilities. These capabilities enable new applications that benefit from rich images and system performance in ways that were previously unavailable to most handheld users. These mobile devices face the challenge of providing a compelling user experience while reducing overall system energy consumption.

To minimize transmission time and storage requirements, compression is used to efficiently store and transmit digitized images. Compression methods have been described by the Joint Photographic Experts Group (JPEG) for still images, and the Motion Picture Experts Group (MPEG) for moving images. For example, U.S. Pat. No. 5,734,755, entitled, "JPEG/MPEG Decoder-Compatible Optimized Thresholding for Image and Video Signal Compression," shows signal encoding of still images and video sequences using DCT.

The JPEG method involves a discrete cosine transform (DCT), followed by quantization and variable-length encoding. The method requires substantial computation. JPEG compression uses controllable losses to reach high compression rates. Information is transformed to a frequency domain through a DCT. Since neighboring pixels in an image have high likelihood of showing small variations in color, the DCT output groups higher amplitudes in lower spatial frequencies. The higher spatial frequencies can be discarded, generating a high compression rate with only a small perceptible loss in the image quality.

In conventional forward DCT (FDCT), image data is subdivided into small two-dimensional segments, in one example, symmetrical 8×8 pixel blocks and each of the 8×8 pixel blocks is processed through a two-dimensional DCT independent of its neighboring blocks. Conventionally, the FDCT operation is as follows:

$$C_u = 1^{1/\sqrt{2}} \text{ if } u = 0 \text{ else}$$

$$C_v = 1^{1/\sqrt{2}} \text{ if } v = 0 \text{ else}$$

$$F_{vu} = 1/4 \; C_u C_v \sum_{y=0}^{N-1} \sum_{x=0}^{N-1} S_{yx} \cos\left(v\pi \frac{2y+1}{2N}\right) \cos\left(u\pi \frac{2x+1}{2N}\right)$$

Implementing this formula in hardware or hardware/software is resource intensive and becomes exponentially more demanding as the size of the N by N block to be transformed is increased.

Since FDCT is a separable transform, it enables the computation 2-dimensional transform using a sequence of 1-dimensional transforms. A 2-D transform of an 8×8 block can be accomplished by 16 1-D transforms. First, each row is transformed using 1-D (8-point) FDCT. Results are stored in consecutive rows of an 8×8 storage array. Then 1-D transform is applied to each array column. Results are stored in consecutive columns of the output array, which then contains the resulting 2-D transform.

The operation described above implements the 2-D transform defined by the following matrix formula:

$$F = D \times P \times D^T$$

Where D is the DCT coefficient matrix, P contains the 8×8 pixel array and $(\bullet)^T$ is the matrix transpose operator. Let $D_{km}$ be D's entry in row k and column m. Then, $$D_{k,m} = \cos\left(\frac{(2m+1) \cdot k \cdot \pi}{16}\right)$$

The matrix D has the unitary property:

$$D \times D^T = I$$

where I is the unit matrix. Therefore, D's inverse is easily computed as $D^{-1} \equiv D^T$. As mentioned above, the 2-D transform can be implemented by a sequence of 1-D transforms. From previous expressions, 1-D FDCT formula is given by:

$$Y_k = \frac{C_k}{2} \sum_{m=0}^{7} x_m \cdot \cos\left(\frac{(2m+1) \cdot k \cdot \pi}{16}\right), \; 0 \leq k \leq 7$$

$$C_k = \begin{cases} \frac{1}{\sqrt{2}} & \text{if } k = 0 \\ 1 & \text{otherwise} \end{cases}$$

where $x_m$ are elements of the input vector. $Y_k$ are elements of the transform vector.

Various methods have been developed for efficient implementation of both 1-D and 2-D FDCT. All those methods attempt to exploit certain symmetries in FDCT formulas. Many methods focus on reducing the total number of multiplication operations, because these are very expensive to implement in hardware, and can be expensive in software on certain microprocessor architectures. One popular FDCT algorithm was developed by Arai, Agui and Nakajima (hereinafter AAN) in "A Fast DCT-SQ Scheme for Images," IEEE Transactions of the IEICE, vol. E71, no. 11, 1988, pp. 1095-1097, the content of which is hereby incorporated by reference. The main advantages of this algorithm are:

1. A total of 13 multiplications are required.
2. Of those 13, 8 multiplications can be deferred to quantization process following FDCT. In practice those 8 operations are completely folded into quantization operations.

FIG. 1 shows a prior art implementation of the AAN fast DCT process 200. As shown in FIG. 1, a vector-matrix multiplication is converted into a sequence of operations that requires fewer memory-consuming operations (such as multiplication) than the original DCT vector-matrix multiplication. The process 200 of FIG. 1 is performed using six computation stages, not counting the final scaling stage between the seventh and eighth columns. The computation stages exist between each column in the DCT process 200, where the columns correspond to clock domains that move the implementation of the AAN DCT algorithm from one computation stage to the next. Variable $X_m$ is an element of the input vector, and $Y_k$ is an element of the transform vector. In this embodiment, five unique coefficients a1 through a5 are used as weights for one or more $X_m$s. The arrows in FIG. 1 represent multiplication by −1. In a hardware implementation, each coefficient requires either a dedicated multiplier or a general-purpose multiplier that allows the use of a different coefficient for each multiply operation.

The two-dimensional transform of an 8×8 pixel block is accomplished by sixteen one-dimensional transforms. First, each row is transformed using a one-dimensional (8-point) DCT. The results are then stored in consecutive rows of an 8×8 storage array. The one dimensional transform is applied to each array column. Results are stored in consecutive columns of the output array, which then contains the resulting two-dimensional transform. The operations of the AAN DCT process 200 include multiply, add, multiply-accumulate, and move (no-op), as well as accumulate-multiply, in which two inputs are summed and subsequently fed into a multiplier.

Each computation stage includes eight simple dyadic operations. More specifically, eight add operations are performed in computation stage 1. Two move operations, three add operations, one multiply operation, and two multiply-accumulate operations are performed in computation stage 2. Two move operations, three add operations, one multiply operation, and two multiply-accumulate operations are performed in computation stage 3. Two move operations, two add operations, two multiply operations, and two multiply-accumulate operations are performed in computation stage 4. The accumulate-multiply operations, represented by each of the two pairs of diagonal lines connected to the coefficient a5, demand more memory resources to perform than the other operations. Four move operations and five add operations are performed in computation stage 5. Eight multiply operations are performed in computation stage 6. Further, the multiply operations are not distributed across the computation stages.

SUMMARY

Systems and methods are disclosed to perform fast discrete cosine transform (DCT) by computing the DCT in five stages using three coefficients, and scaling the outputs using a plurality of scaling coefficients.

Advantages of the system may include one or more of the following. The system provides a modified DCT engine that enables JPEG encoding to be done in real time while requiring minimal hardware resources. The DCT process implemented by the engine is computationally efficient in JPEG-encoding applications. Moreover, the system does not require large amounts of system memory in performing the required calculations. Further, the system distributes multiply operations across the computation stages, enabling both an advantageous pipelined implementation and the practical application of a general-purpose processor.

Other advantages include a compact implementation and the sharing of many operations using the same circuitry to allow space reduction while maintaining a highly efficient algorithm. A power efficient implementation is achieved.

As a result, the system is ideal for applications where it is desirable to compress and/or display and/or transmit the desired images in real time, for example, in devices fast gaining popularity such as cellular phones or PDAs with video camera functionality. By accelerating graphics and video, the system enables new applications that benefit from rich images. The system also enhances visualization performance in ways that were previously unavailable to most handheld users while minimizes overall system power consumption.

BRIEF DESCRIPTION OF THE FIGURES

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2F shows a spread sheet for DCT showing the operation of one implementation.

DESCRIPTION

Figure 1:
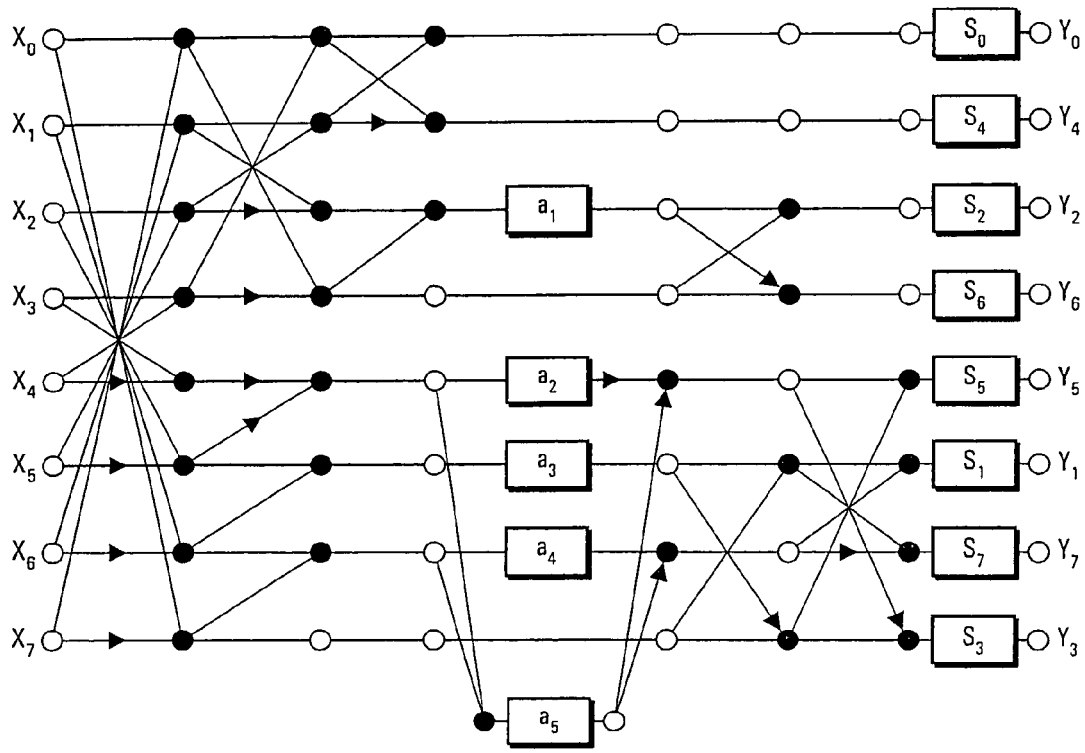
FIG. 1 shows a prior art implementation of a fast DCT process by Arai, Agui, and Nakajima.

Referring now to the drawings in greater detail, there is illustrated therein structure diagrams for a fast DCT engine and logic flow diagrams for processes a system will utilize to compress, encode and transmit images, as will be more readily understood from a study of the diagrams.

Figure 2A:
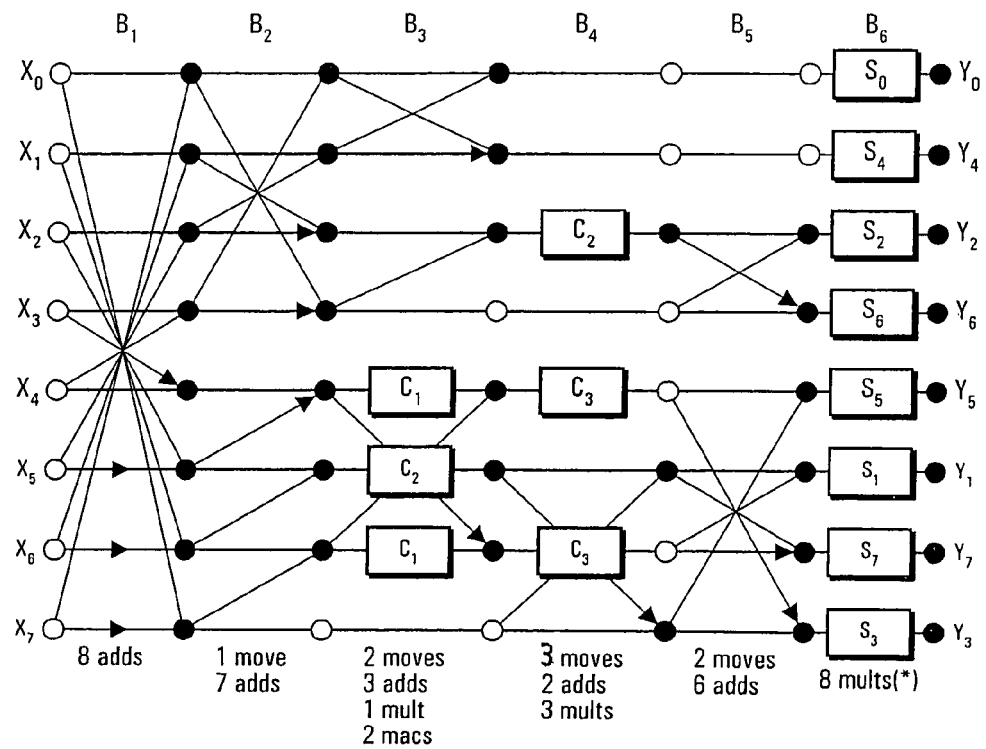
FIG. 2A shows one embodiment of a fast DCT process in accordance with the present invention.

FIG. 2A shows one embodiment of a DCT process 300 in accordance with one aspect of the present invention. The process 300 implements the following operations:

$$F_{vu} = \frac{1}{4} C_v C_u \sum_{y=0}^{N-1} \sum_{x=0}^{N-1} S_{yx} \cos\left(v\pi \frac{2y+1}{2N}\right) \cos\left(u\pi \frac{2x+1}{2N}\right)$$

$$F_{vu} = \frac{1}{2} C_v \sum_{y=0}^{N-1} \cos\left(v\pi \frac{2y+1}{2N}\right) \left[\frac{1}{2} C_u \sum_{x=0}^{N-1} S_{yx} \cos\left(u\pi \frac{2x+1}{2N}\right)\right]$$

$$F_{vu} = \frac{1}{2} C_u \sum_{x=0}^{N-1} S_x \cos\left(u\pi \frac{2x+1}{2N}\right)$$

The process 300 includes one more multiply operation than the DCT process 200, but it requires two fewer unique coefficients ($c_1$-$c_3$, as opposed to $a_1$-$a_5$) and one fewer computation stage (five, as opposed to six, not counting the final scaling stages). The reduction in the number of coefficients in DCT algorithm 300 as compared with DCT algorithm 200 enables the inclusion of a specialized multiplier for each unique coefficient $c_1$-$c_3$. The coefficients $c_1$-$c_3$ and $s_m$ are defined below:

$$c_1 = \frac{CS(2)}{CS(6)}$$

$$c_2 = CS(4)$$

$$c_3 = CS(6)$$

$$s_0 = s_4$$

$$s_m = \frac{1}{4 \cdot CS(m)}, 1 \le m \le 7$$

$$CS(m) = \cos\left(\frac{m \cdot \pi}{16}\right)$$

The system of FIG. 2A implements a series of vector operations in stages as follows:

```
// dct stages
void
Cdct::stage1(const double* in, double* out) const
{
    out[0] = in[0] + in[7];
    out[1] = in[1] + in[6];
    out[2] = in[2] + in[5];
    out[3] = in[3] + in[4];
    out[4] = in[3] - in[4];
    out[5] = in[2] - in[5];
    out[6] = in[1] - in[6];
    out[7] = in[0] - in[7];
    precision(out);
}
void
Cdct::stage2(const double* in, double* out) const
{
    out[0] = in[0] + in[3];
    out[1] = in[1] + in[2];
    out[2] = in[1] - in[2];
    out[3] = in[0] - in[3];
    out[4] = -(in[4] + in[5]);
    out[5] = in[5] + in[6];
    out[6] = in[6] + in[7];
```

-continued

```
    out[7] = in[7];
    precision(out);
}
void
Cdct::stage3(const double* in, double* out) const
{
    out[0] = in[0] + in[1];
    out[1] = in[0] - in[1];
    out[2] = in[2] + in[3];
    out[3] = in[3];
    out[4] = c1*in[4] + in[6];
    out[5] = c2*in[5];
    out[6] = c1*in[6] - in[4];
    out[7] = in[7];
    precision(out);
}
void
Cdct::stage4(const double* in, double* out) const
{
    out[0] = in[0];
    out[1] = in[1];
    out[2] = c2*in[2];
    out[3] = in[3];
    out[4] = c3*in[4];
    out[5] = in[7] + in[5];
    out[6] = c3*in[6];
    out[7] = in[7] - in[5];
    precision(out);
}
void
Cdct::stage5(const double* in, double* out) const
{
    out[0] = in[0];
    out[1] = in[1];
    out[2] = in[3] + in[2];
    out[3] = in[3] - in[2];
    out[4] = in[7] - in[4];
    out[5] = in[5] + in[6];
    out[6] = in[5] - in[6];
    out[7] = in[7] + in[4];
    precision(out);
}
// stage5 with properly ordered output
void
Cdct::stage5_ord(const double* in, double* out) const
{
    double tmp[8];
    stage5(in,tmp);
    out[0] = tmp[0];
    out[4] = tmp[1];
    out[2] = tmp[2];
    out[6] = tmp[3];
    out[5] = tmp[4];
    out[1] = tmp[5];
    out[7] = tmp[6];
    out[3] = tmp[7];
}
```

More details on the software implementation are provided in the attached Appendix.

In an alternate equivalent implementation, the DCT operation can be viewed as a series of vector multiplication B5*B4*B3*B2*B1*PM*SF where the input and output are eight element vectors. The matrixes of the vector multiplication implementation are as follows:

B5 Matrix:

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & -1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & 1 & 0 & 0 & 1 \end{bmatrix}$$

B4 Matrix:

$$\begin{bmatrix} 1 & 0 & 0 & 0 & 0 & 0 & 0 & 0 \\ 0 & 1 & 0 & 0 & 0 & 0 & 0 & 0 \\ 0 & 0 & \frac{1}{2}\sqrt{2} & 0 & 0 & 0 & 0 & 0 \\ 0 & 0 & 0 & 1 & 0 & 0 & 0 & 0 \\ 0 & 0 & 0 & 0 & \cos\left(\frac{3}{8}\pi\right) & 0 & 0 & 0 \\ 0 & 0 & 0 & 0 & 0 & 1 & 0 & 1 \\ 0 & 0 & 0 & 0 & 0 & 0 & \cos\left(\frac{3}{8}\pi\right) & 0 \\ 0 & 0 & 0 & 0 & -1 & 0 & 0 & 1 \end{bmatrix}$$

B4 Matrix (Floating Point):

$$\begin{bmatrix} 1. & 0. & 0. & 0. & 0. & 0. & 0. & 0. \\ 0. & 1. & 0. & 0. & 0. & 0. & 0. & 0. \\ 0. & 0. & .70710 & 0. & 0. & 0. & 0. & 0. \\ 0. & 0. & 0. & 1. & 0. & 0. & 0. & 0. \\ 0. & 0. & 0. & 0. & .38268 & 0. & 0. & 0. \\ 0. & 0. & 0. & 0. & 0. & 1. & 0. & 1. \\ 0. & 0. & 0. & 0. & 0. & 0. & .38268 & 0. \\ 0. & 0. & 0. & 0. & -1. & 0. & 0. & 1. \end{bmatrix}$$

B3 Matrix:

$$\begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 0 & 1 & 0 & 0 & 0 & 0 \\ 0 & 0 & 0 & 0 & \dfrac{\cos\left(\frac{1}{8}\pi\right)}{\cos\left(\frac{3}{8}\pi\right)} & 0 & 1 & 0 \\ 0 & 0 & 0 & 0 & 0 & \frac{1}{2}\sqrt{2} & 0 & 0 \\ 0 & 0 & 0 & 0 & -1 & 0 & \dfrac{\cos\left(\frac{1}{8}\pi\right)}{\cos\left(\frac{3}{8}\pi\right)} & 0 \\ 0 & 0 & 0 & 0 & 0 & 0 & 0 & 1 \end{bmatrix}$$

B3 Matrix (Floating Point):

$$\begin{bmatrix} 1. & 1. & 0. & 0. & 0. & 0. & 0. & 0. \\ 1. & -1. & 0. & 0. & 0. & 0. & 0. & 0. \\ 0. & 0. & 1. & 1. & 0. & 0. & 0. & 0. \\ 0. & 0. & 0. & 1. & 0. & 0. & 0. & 0. \\ 0. & 0. & 0. & 0. & 2.4142 & 0. & 1. & 0. \\ 0. & 0. & 0. & 0. & 0. & .70710 & 0. & 0. \\ 0. & 0. & 0. & 0. & -1. & 0. & 2.4142 & 0. \\ 0. & 0. & 0. & 0. & 0. & 0. & 0. & 1. \end{bmatrix}$$

B2 Matrix:

$$\begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & 1 & -1 & 0 & 0 \\ 0 & 0 & 0 & 0 & 0 & 1 & 1 & 0 \\ 0 & 0 & 0 & 0 & 0 & 0 & 1 & 1 \\ 0 & 0 & 0 & 0 & 0 & 0 & 0 & 1 \end{bmatrix}$$

B1 Matrix:

$$\begin{bmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & -1 & 1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{bmatrix}$$

The corresponding equations for stages 5 . . . 1, respectively, are as follows:

$$[ii_1, ii_2, ii_3 + ii_4, -1 \cdot ii_3 + ii_4, -1, ii_5 + ii_8, ii_6 + ii_7, ii_6 - 1 \cdot ii_7, ii_5 + ii_8]$$

$$[ii_1, ii_2, 0.70710\, ii_3, ii_4, 0.38268\, ii_5, ii_6 + ii_8, 0.38268\, ii_7, -1 \cdot ii_6 + ii_8]$$

$$[ii_1 + ii_2, ii_1 - 1 \cdot ii_2, ii_3 + ii_4, ii_4, 2.4142\, ii_5 + ii_7, 0.70710\, ii_6, -1 \cdot ii_6, ii_6 + ii_7, ii_7 + ii_8, ii_8]$$

$$[ii_1 + ii_4, ii_2 + ii_3, ii_2 - 1 \cdot ii_3, ii_1 - 1 \cdot ii_4, ii_5 - 1 \cdot ii_6, ii_6 + ii_7, ii_7 + ii_8, ii_8]$$

$$[ii_1 + ii_8, ii_2 + ii_7, ii_3 + ii_6, ii_4 + ii_5, -1 \cdot ii_4 + ii_5, ii_3 - 1 \cdot ii_6, ii_2 - 1 \cdot ii_7, ii_1 - 1 \cdot ii_8]$$

Permutation Matrix (PM):

$$\begin{bmatrix} 1 & 0 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 1 & 0 & 0 & 0 \\ 0 & 0 & 0 & 1 & 0 & 0 & 0 & 0 \\ 0 & 0 & 0 & 0 & 0 & 0 & 1 & 0 \end{bmatrix}$$

Scale Factors (SF):

$$\frac{1}{4}\begin{bmatrix} \sqrt{2} & 0 & 0 & 0 & 0 & 0 & 0 & 0 \\ 0 & \frac{1}{\cos\left(\frac{1}{16}\pi\right)} & 0 & 0 & 0 & 0 & 0 & 0 \\ 0 & 0 & \frac{1}{\cos\left(\frac{1}{8}\pi\right)} & 0 & 0 & 0 & 0 & 0 \\ 0 & 0 & 0 & \frac{1}{\cos\left(\frac{3}{16}\pi\right)} & 0 & 0 & 0 & 0 \\ 0 & 0 & 0 & 0 & \sqrt{2} & 0 & 0 & 0 \\ 0 & 0 & 0 & 0 & 0 & \frac{1}{\cos\left(\frac{5}{16}\pi\right)} & 0 & 0 \\ 0 & 0 & 0 & 0 & 0 & 0 & \frac{1}{\cos\left(\frac{3}{8}\pi\right)} & 0 \\ 0 & 0 & 0 & 0 & 0 & 0 & 0 & \frac{1}{\cos\left(\frac{7}{16}\pi\right)} \end{bmatrix}$$

The operations that occur in the fast DCT process 300 include dyadic operations such as multiply, add, multiply-accumulate, and move (no-op). This stands in contrast to the implementation of the AAN DCT algorithm, as illustrated by DCT algorithm 200, in which accumulate-multiply operations are necessary and the hardware implementation is more costly. Further, the multiply operations are distributed across computation stages three and four of improved DCT algorithm 300, enabling the five computation stages to be pipelined, significantly improving throughput.

Each computation stage includes eight simple dyadic operations. More specifically, eight add operations are performed in computation stage 1. One move operations and seven add operations are performed in computation stage 2. Two move operations, three add operations, one multiply operation, and two multiply-accumulate operations are performed in computation stage 3. Three move operations, two add operations and three multiply operations are performed in computation stage 4. Two move operations and six add operations are performed in computation stage 5. Thereafter, eight multiply operations may be performed in a quantization stage (step 408 of method 400 in FIG. 4).

Figure 2B:
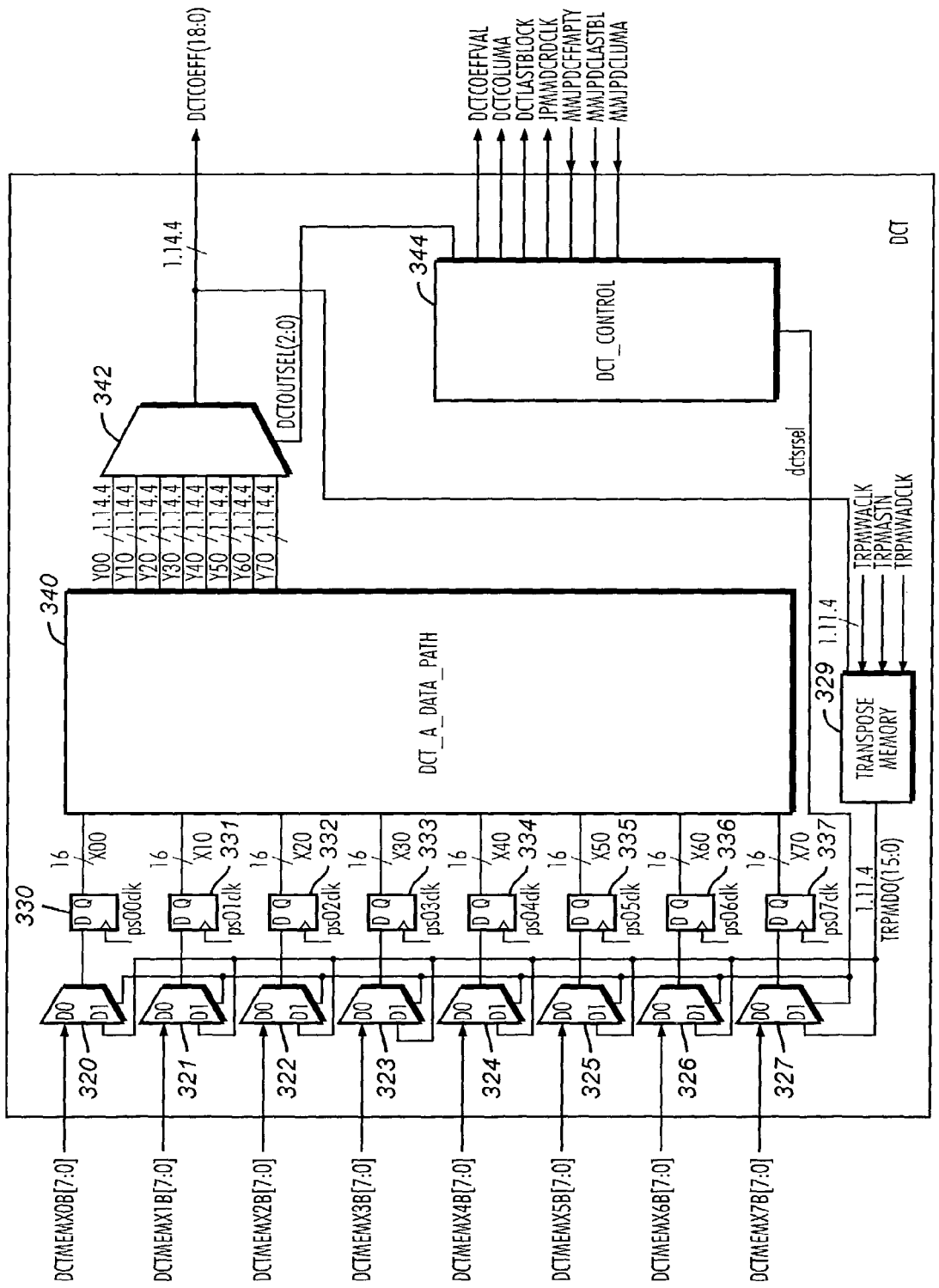
FIG. 2B shows a block diagram of a DCT engine that generates DCT coefficients as outputs.

FIG. 2B shows a block diagram of a DCT engine that generates DCT coefficients as outputs. In the embodiment of FIG. 2B, eight multiplexers 320-327 receive DCT values X0-X7 at a first set of inputs. In the embodiment of FIG. 2B, eight multiplexers 320-327 receive X0-X7 at a first set of inputs. The multiplexers 320-327 receive transposed memory values from a transpose memory 329 at a second set of inputs. The output of the multiplexers 320-327 are stored by latches 330-337, respectively. The latches 330-337 are clocked in sequence by clock signals ps00clk-ps07clk, respectively. The output of the latches 330-337 are provided to a data path block 340, which is detailed in FIG. 2C. The output of the data path block 340 is provided to an eight to one multiplexer 342, which selects one of the eight outputs from the data path block 340 as the DCT coefficient output.

The multiplexers 320-327 are used to select the input of the DCT algorithm data path module. The input can be from memory or from the transpose buffer. 1-D DCT is used to calculate 2-D DCT. For each 8×8 data block, one-dimensional DCT of the 8×8 block read from the image memory is computed in row-major order. The row-major order coefficients from the first round of 1-D DCT are stored in a transpose memory one component in a clock cycle.

The 2-D DCT is calculated by reading the 1-D DCT coefficients from the transpose memory in column major order, and by calculating the 1-D DCT on those components. The second round of DCT outputs (DCT coefficients) are sent to the quantization module in column major order.

The DCT processing starts only when all the new bus data is latched into all of the latches (330-337). The outputs 320-327 are stored in the 330-337 latches only when data units needed to be fed to DCT calculation (DCT data path) logic. This is achieved by enabling ps00clk-ps07 clocks when the following conditions are met:

At the first round, 8×8 data units are needed to be fed as inputs (all of the clocks are enables at once; only one cycle). The incoming data is latched and used in first round of DCT calculation in the next clock cycle.

Before the second round start, the data from the transpose buffer is sent to latches one bus data at a time (in one clock cycle); first 330, then 331, then 332, 333, 334, 335 and 336, and the last one 337. The second round DCT processing starts when all the busses are latched into the latches (330-337).

The DCT processing scheme minimizes power consumption through extensive gated clocking. The scheme also minimizes the wide buses (thus is chip space efficient) by sending one bus in a clock cycle for the second round from the transpose buffer. Moreover, back to back stages of the implementation are not activated both at the same time. This avoids the clock skew issues that are quite common for back to back pipeline stages running with parallel gated clocks. The DCT scheme is also a gate efficient implementation.

The DCT algorithm minimizes the math operations. The implementation of it takes the advantages of the algorithm further by making even more reduction in the total number of math operations: conventional DCT scheme has 26 adders while the implementation has 7 adders. Moreover, conventional DCT scheme has 4 multipliers and 2 MACs while the implementation has 2 multipliers and 1 MAC.

Controlling the transpose memory 329 as well as the multiplexers 320-327 and 342 is a DCT controller 344. In one embodiment, DCT controller 344 generates the gated clocks that control input latches of 1-D DCT data path, transpose memory latches, and Quantization data latches. 1-D DCT data module is proceeded by data latches 330-337 that are enabled every 8 clocks for the first phase of 2-D DCT calculation when a new 8×8 tile data is fed in row major order; the latches 330-337 are enabled in sequence during the second phase of DCT calculation when the 1-D processed 8×8 data is fed in column major order from the transpose memory 329.

1-D DCT data path logic sends 1 data bus out instead of 8 data buses out at the same time. This minimizes the follow up logic in terms of gate count, and in terms of routing the signals. The follow up logic to 1-D DCT data path logic is either transpose memory in case of first round 1-D DCT out or quantization module in case of second round 1-D DCT out.

Transpose memory clock is enabled starting from the time at which the first round output of 1-DCT in row major order is available; it is kept enabled for the 64 consecutive clocks. The minimum interval between two consecutive 66 clock toggling is 64 clocks; during that 66 idle clock period, the transpose memory clock is disabled.

The quantization logic is enabled starting from the time at which the second round output of 1-DCT in column major order is available; it is kept enabled for the 64 consecutive clocks. The minimum interval between two consecutive 64 clock toggling is 66 clocks; during that 66 idle clock period, the quantization clock is disabled.

Using gated clocks for the transpose memory and the quantization logic eliminates the muxing logic that would be otherwise required as holding data logic for the inputs of transpose memory and quantization logic.

DCT controller 344 generates data path and the control logic gated clocks; this allows significant dynamic power saving throughout the process, eliminates the data holding mixes for modules that have the same data bus as their data bus inputs, and simplifies the clock skew management by minimizing the clock load (clock load is distributed among the gated clocks instead of having one single processing clock).

Figure 2C:
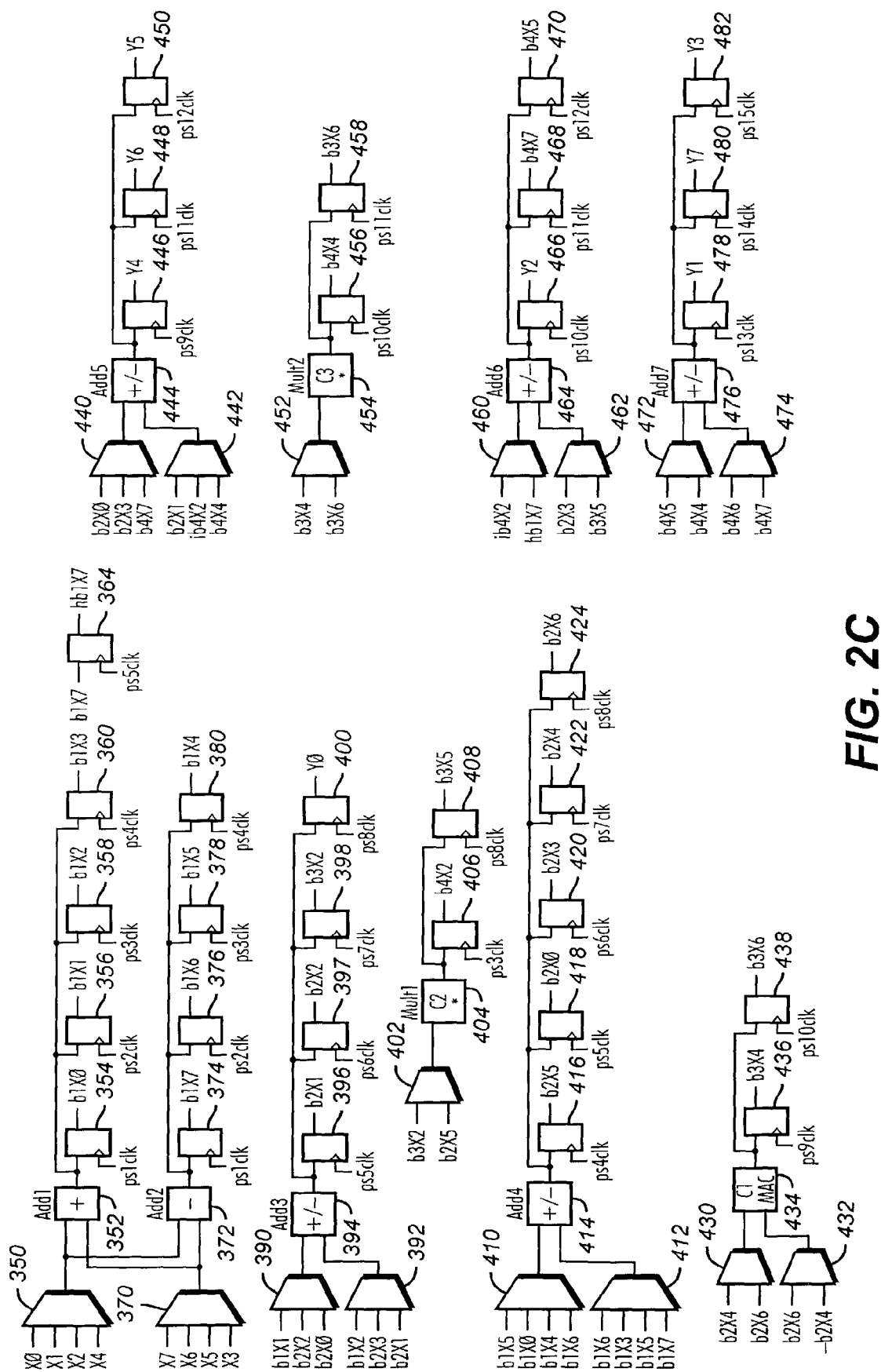
FIG. 2C shows more detail of one embodiment of a data path block in the engine of FIG. 2B.

Referring now to FIG. 2C, one embodiment of the data path block 340 in the engine of FIG. 2B is shown. A first multiplexer 3100 receives X0, X1, X2 and X4. One of these inputs is selected and provided to an adder 352. The second input of the adder 352 is connected to the output of a second multiplexer 370. The multiplexer 370 receives as inputs X7, X6, X5 and X3. The adder 352 drives the inputs of flip-flops 352-360, which latches values corresponding to B1X0, B1X1, B1X2 and B1X3 when clocked by clock signals ps1clk, ps2clk, ps3clk and ps4clk, respectively.

The outputs of the multiplexers 350 and 370 are also connected to a subtractor 372. The subtractor 372 drives the inputs of flip-flops 374-380, which latches values corresponding to B1X7, B1X6, B1X5 and B1X4 when clocked by clock signals ps1clk, ps2clk, ps3clk and ps4clk, respectively.

Also, the value B1X7 is latched by flip-flop 364 by clock ps5clk to generate HB1X7 value.

A multiplexer 390 receives B1X1, B2X2, and B2X0 at its inputs and provides a selected value to an adder/subtractor 394. The other input to the adder/subtractor 394 is provided by a multiplexer 392 that receives B1X2, B2X3 and B2X1 as inputs. The output of the adder/subtractor 394 is connected to flip-flops 396-400, which is clocked by clock signals ps5clk, ps6clk, ps7clk and ps8clk, respectively, to latch values B2X1, B2X2, B3X2 and Y0, respectively.

A multiplexer 402 receives as inputs B3X2 and B2X5 and provides a selected value to a multiplier 404. The selected value is multiplied with a coefficient C2, which is stored in memory. The output of the multiplier 404 is provided to flip-flops 406 and 408. These flip-flops are clocked by ps3clk and ps8clk clock signals, respectively. The flip-flop 406 provide as output B4X2, and the flip-flop 408 provide as output B3X5.

Next, a multiplexer 410 receives at its inputs B1X5, B1X0, B1X4 and B1X6. Corresponding, a multiplexer 412 receives at its inputs B1X6, B2X3, B2X5 and B2X7. Selected values are provided by multiplexers 410-412 to an adder/subtractor 414. The output of adder/subtractor 414 is provided to flip-flops 416-424, which are clocked by ps4clk, ps5clk, ps6clk, ps7clk and ps8clk, to latch values B2X5, B2X0, B2X3, B2X4 and B2X6, respectively.

A multiplexer 430 receives as inputs B2X4 and B2X6, while a multiplexer 432 receives as inputs B2X6 and –B2X4. The selected values are provided by multiplexers 430-432 to a Multiply-Accumulate (MAC) unit 434 with a stored coefficient C1. The output of the MAC unit 434 is provided to flip-flops 436-438, which when clocked by clock signals ps9clk and ps10clk, provides B3X4 and B3X6, respectively.

Next, a multiplexer 440 receives as inputs B2X0, B2X3, and B4X7 while a multiplexer 442 receives as inputs B2X1, B4X2 and B4X4. The selected values are provided by multiplexers 440-442 to an adder/subtractor 444. The output of the adder/subtractor 444 is provided to flip-flops 446-450, and when clocked by clock signals ps9clk, ps10clk and ps12clk, latches values Y4, Y6 and Y5, respectively.

Also, a multiplexer 452 receives as inputs B3X4 and B3X6. One of these inputs is selected and provided to a multiplier 454 to be multiplied with a coefficient C3. The output of the multiplier 454 is provided to flip-flops 456-458, and upon clocking by ps10clk and ps11clk, the flip-flops 456-458 latches values B4X4 and B3X6, respectively.

Additionally, a multiplexer 460 selects either IB4X2 or HB1X7 while a multiplexer 462 selects either B2X3 and B3X5. The outputs of the multiplexers 460-462 are provided to an adder/subtractor 464, whose output is provided to flip-flops 468 and 470. Further, a multiplexer 472 selects either B4X5 or B4X4 while a multiplexer 474 selects either B4X6 or B4X7 and the selected values are provided to an adder/subtractor 476. The output of the adder/subtractor 476 is provided to flip-flops 478-482. When clocked by clock signals ps10clk, ps11clk, ps12clk, ps13clk, ps14clk and ps15clk, flip-flops 468-482 latches values Y2, B4X7, B4X5, Y1, Y7 and Y3, respectively.

The above implementation results in a compact unit by sharing of many operations using the same circuitry to allow space reduction while maintaining a highly efficient algorithm. A power efficient implementation is achieved: every processing stage controlled by the related gated clocks; PS0 to PS15 have their own gated clocks. PS9 and PS15 overlaps with PS1 to PS7 respectively. Clocks enabled in the following order (one/two process stage clock at a time): ps1clk (processing stage 1 clock)/ps9clk (processing state 9 clock), ps2clk/ps10clk, ps3clk/ps11clk, ps4clk/ps12clk, ps5clk/ps13clk), ps6clk/ps14clk), ps7clk/ps15clk, and ps8clk.

Figure 2D:
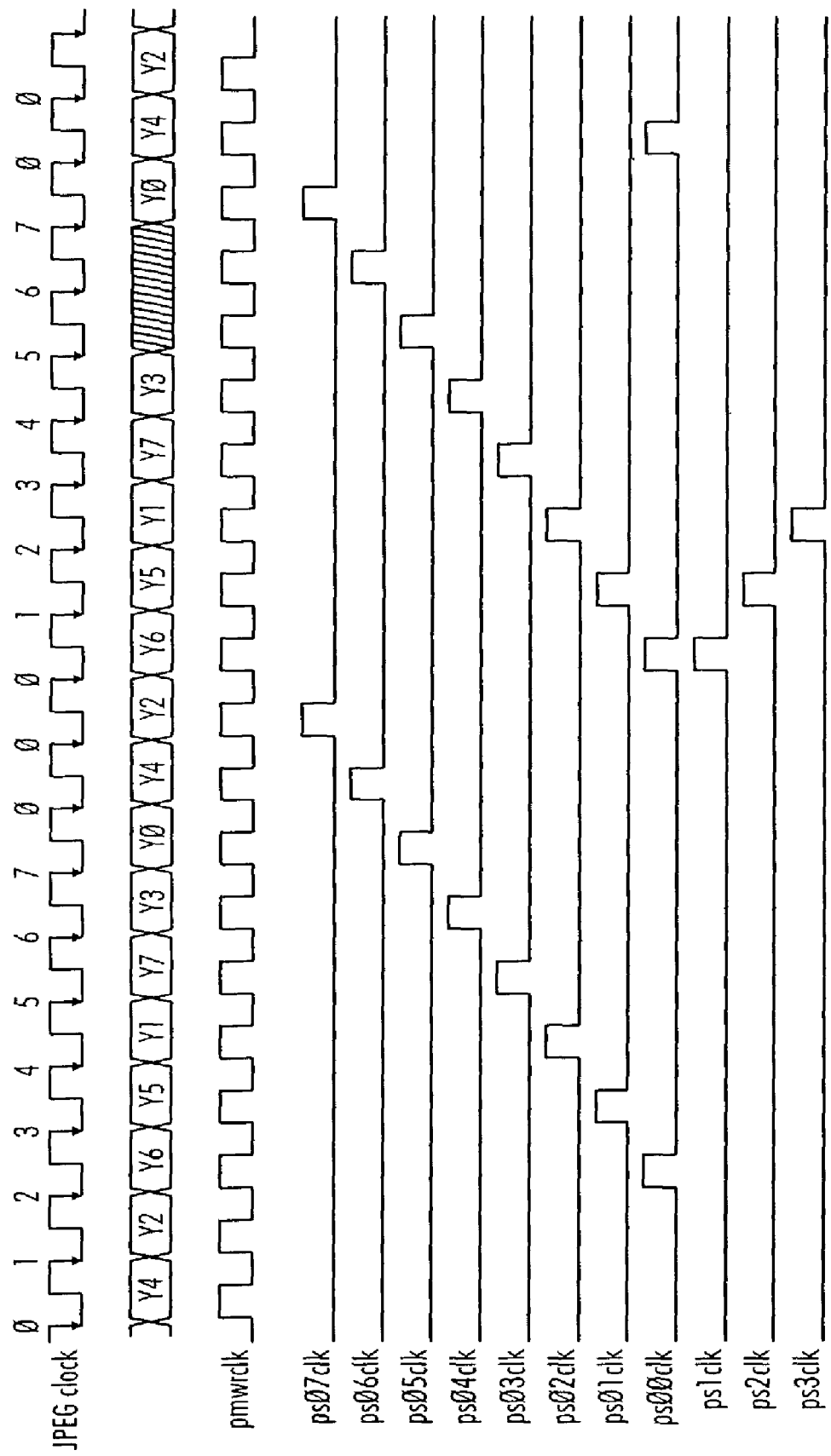
FIGS. 2D-2E show a timing diagram illustrating clocking when data comes from a transpose memory.

FIG. 2D shows a timing diagram illustrating clocking when data comes from a transpose memory. In FIG. 2D, the first row represents a JPEG clock signal that controls the rest of the timing. The JPEG clock cycle runs continuously from clock 0 through clock 7 with a two clock cycle idle period separating each cycle. The second row represents data for each row and column, each separated by Y0, Y4 and Y2 of the transpose memory, respectively. The third row represents pmwrclk, which in turn defines the timing for clock signals ps00clk through ps07clk, respectively. Moreover, a psclk signal is derived from the ps00clk signal, and ps2clk and ps3clk are generated one and two clock periods after the assertion of the psclk signal.

FIG. 2D shows a timing diagram illustrating clocking when data comes from regular memory. There are 15 processing states in the implementation (some overlaps as indicated). All the stages run with sixteen different gated clock ps1clk-ps15clk. Eight busses are fed to DCT module in parallel, but not processed in parallel.

Figure 2E:
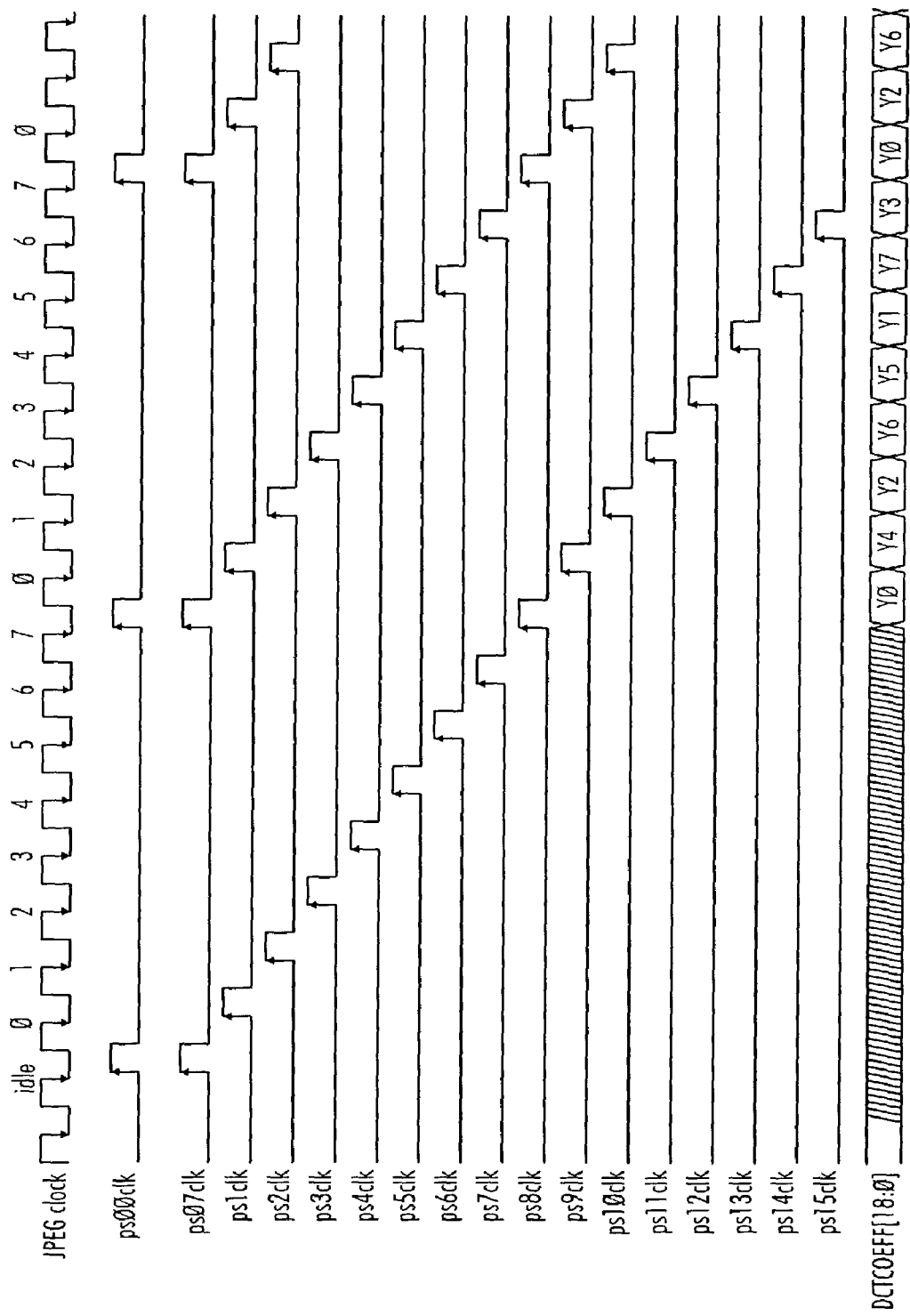

In FIG. 2E, the first row represents JPEG clock which clocks data for each row of data every eight JPEG clocks. Thus, a row counter is initialized for the first eight active JPEG clocks and is incremented every subsequent ninth JPEG clock. The clock signal ps00clk is first asserted just before the row counter is initialized. The clock signal ps007clk is also asserted when the clock signal ps00clk is asserted.

In the next clock periods, clock signals ps1clk through ps15clk are sequentially asserted. Until all row data has been computed, the clock signals ps00clk, ps07clk, ps1clk, ps2clk, ps3clk, ps4clk, ps5clk, ps6clk, ps7clk, ps8clk, ps9clk, ps10clk, ps11clk, ps12clk, ps13clk, ps14clk and ps15clk are asserted once every eighth JPEG clock. Data for the DCT coefficients Y0, Y4, Y2, Y6, Y5, Y1, Y7 and Y3 is sequentially placed on the DCTCOEFF bus starting from the first ps8clk through ps15clk due to pipeline delay, but afterward, DCT coefficient data is placed on the bus every JPEG clock cycle until all row coefficient data has been computed. Thus, the DCT module outputs one DCT coefficient on the DCT coefficient bus every clock; the initial latency is 8 clocks. The eight busses are fed at every 8 clocks.

FIG. 2F shows a spread sheet that summarizes the operation of the above DCT engine. B1 through B5 correspond to algorithm stages shown in FIG. 2A. The operations with the same pattern indicate mathematical operations sharing (not repeated) blocks of the hardware implementation. In Processing State1/State9 (Y4 out), the following computations are performed:

$$B1X0=X0+X7$$

$$Y4=B2X0-B2X1$$

$$IB4X2=B3X2*C2$$

$$B3X4=B2X4*C1+B2X6$$

$$B1X7=X0-X7$$

In one embodiment, B1X0=(13+4) bits, Y4=(15+4) bits, IB4X2=(14+4) bits, B3X4=(16+4) bits, IB3X6=(15+4) bits, B1X7=(13+4) bits In processing state2/state10 (Y2 out), the following computations are performed:

$$B1X1=X1+X6$$

$$Y2=IB4X2+B2X3$$

$$B4X4=B3X4*C3$$

$$B1X6=X1-X6$$

$$B3X6=B2X6*C1-B2X4$$

In one embodiment, B1X1=(13+4) bits, Y2=(15+4) bits, B4X4=(14+4) bits, B1X6=(13+4), B3X6=(16+4) bits In Processing State3/State 11 (Y6 out), the following is computed:

$$B1X2=X2+X5$$

$$Y6=(B2X3-IB4X2)$$

$$B4X6=B3X6*C3$$

$$B1X5=X2-X5$$

$$B4X7=HB1X7-B3X5$$

In one embodiment, B1X2=(13+4) bits, Y6=(14+4) bits, B4X6=(14+4) bits, B1X5=(13+4) bits, B4X7=(14+4) bits.

In Processing State4/State12 (Y5 out), the following is determined:

$$B1X3=X3+X4$$

$$B1X4=X4-X3$$

$$B2X5=B1X5+B1X6$$

$$B4X5=B3X5+HB1X7$$

$$Y5=B4X7-B4X4$$

In one embodiment, B1X3 (13+4) bits, B1X4=(13+4) bits, B4X5=(14+4) bits, Y5=(14+4) bits, B2X5=(14+4) bits In Processing State5/State13 (Y1 out), the following is ascertained:

$$B2X0=B1X0+B1X3$$

$$B2X1=B1X1+B1X2$$

$$Y1=B4X5+B4X6$$

$$HB1X7=B1X7$$

In one embodiment, B2X0=(14+4) bits, B2X1=(14+4) bits, Y1=(15+4) bits.

In Processing State6/State14 (Y7 out), the following is determined:

$$B2X2=B1X1-B1X2$$

$$B2X3=B1X0-B1X3$$

$$Y7=B4X5-B4X6$$

In one embodiment, B2X2=(14+4) bits, B2X3=(14+4) bits, and Y7=(13+4) bits.

In Processing State7/State15 (Y3 out), the following is determined:

$$B3X2=B2X2+B2X3$$

$$B2X4=B1X4-B1X5$$

$$Y3=B4X4+B4X7$$

In one embodiment, B3X2=(15+4) bits, B2X4=(14+4) bits, and Y3=(15+4) bits.

In Processing State8 (Y0 out), the following is processed:

$$Y0=B2X0+B2X1$$

$$B3X5=B2X5*C2$$

$$B2X6=B1X6+B1X7$$

In one embodiment, B2X6=(14+4) bits, Y0=(15+4) bits, B3X5=(13+4 bits), IB3X4=(15+4) bits.

In one embodiment, values generated by the FDCT are passed to a fast quantizer transform (FQT). FQT including the fraction part (4 bits). No rounding takes place between FDCT and FQT. Quantization process involves dividing frequency domain coefficients by frequency dependent integer values in the range [1,255]. This process normally generates many zero values, especially at higher frequencies. One implementation supports 2 quantization tables, one for luma and one for chroma. Those tables are loaded prior to initiating compression.

Quantization tables as defined by the JPEG standard have 64 entries. Each entry is an 8-bit number. In one embodiment, reciprocals of each table entry are pre-computed and scaled according to a table post-FDCT coefficient. Post-FDCT coefficient table is shown below.

$$\begin{bmatrix} .1250000000 & .09011997769 & .09567085808 & .1063037618 & .1250000000 & .1590948226 & .2309698829 & .4530637231 \\ .09011997769 & .06497288313 & .06897484481 & .07664074119 & .09011997769 & .1147009749 & .1665200056 & .3266407412 \\ .09567085808 & .06897484481 & .07322330470 & .08136137693 & .09567085808 & .1217659056 & .1767766952 & .3467599614 \\ .1063037618 & .07664074119 & .08136137693 & .09040391825 & .1063037618 & .1352990251 & .1964237395 & .3852990251 \\ .1250000000 & .09011997769 & .09567085808 & .1063037618 & .1250000000 & .1590948226 & .2309698829 & .4530637231 \\ .1590948226 & .1147009749 & .1217659056 & .1352990251 & .1590948226 & .2024893006 & .2939689005 & .5766407415 \\ .2309698829 & .1665200056 & .1767766952 & .1964237395 & .2309698829 & .2939689005 & .4267766950 & .8371526010 \\ .4530637231 & .3266407412 & .347599614 & .3852990251 & .4530637231 & .5766407415 & .8371526010 & 1.642133898 \end{bmatrix}$$

Let $H_{km}$, k=1 . . . 8, m=1 . . . 8, represent the quantization values to be used and let $P_{km}$ represent the post-FDCT coefficient values shown above; let $Q_{km}$ represent values of in the JPEG quantization table. Then values $H_{km}$ are obtained according to:

$$H_{k,m} = \left\langle \frac{P_{k,m}}{Q_{k,m}} \right\rangle_{fp12.4}$$

where the operator $\langle \rangle_{fp12.4}$ represents conversion to a floating-point representation with 12 bits mantissa and 4 bits exponent. This conversion is described later in this section.

As an example, consider quantization table "0" shown below. The values would be:

In the table above the smallest value is ≈0.0015 and the largest value is ≈0.017. The ratio between the largest and the smallest value is ≈11. In the general case, the largest possible value produced is ≈1.64 and smallest possible value is ≈0.00025. Their ratio is ≈6445, corresponding to 13 bits of dynamic range. Therefore, in order to represent even the smallest value with 12 bits of accuracy, a total of 25 bits would be required to cover the entire range.

In one embodiment, a floating-point representation with 12 bits mantissa and 4 bits exponent is used. For a given finite precision value h, mantissa and exponent are chosen such that $$h = \frac{M}{2^E}$$

Where M is the 12-bit mantissa value, and E is the appropriate exponent value. Given a full precision value H computed as above, M and E are calculated as follows:

$$E = -\lfloor \log_2(H) \rfloor$$

$$M = \text{round}(H \times 2^{E+11})$$

Given the possible range of H (0.00025≦H≦1.64), the expressions above result in $$0 \leq E \leq 12$$

$$2048 \leq M \leq 4096$$

The case M=4096 should be avoided. If it happens, M is replaced with M/2; E is decremented by 1. M can be represented with 12 bits with most significant bit always 1. Consequently M's msb does not need to be stored in hardware $$\begin{bmatrix} .0078125 & .0081927 & .0095671 & .0066440 & .0052083 & .0039774 & .0045288 & .0074273 \\ .0075100 & .0054144 & .0049268 & .0040337 & .0034662 & .0019776 & .0027753 & .0059389 \\ .0068336 & .0053058 & .0045765 & .0033901 & .0023918 & .0021362 & .0025620 & .0061921 \\ .0075931 & .0045083 & .0036982 & .0031174 & .0020844 & .0015552 & .0024553 & .0062145 \\ .0069444 & .0040964 & .0025857 & .0018983 & .0018382 & .0014596 & .0022424 & .0058839 \\ .0066290 & .0032772 & .0022139 & .0021140 & .0019614 & .0019470 & .0026015 & .0062678 \\ .0047137 & .0026019 & .0022664 & .0022577 & .0022424 & .0024295 & .0035565 & .0082886 \\ .0062926 & .0035504 & .0036501 & .0039316 & .0040452 & .0057664 & .0081277 & .016587 \end{bmatrix}$$

registers. E values can be stored in 4 bits. Therefore 15 bits of storage are required per quantization table coefficient. For the example above, the following table contains actual values loaded into hardware quantization table registers:

$$\begin{bmatrix} 7 & 1607 & 7367 & 22968 & 10936 & 600 & 5224 & 29544 \\ 30232 & 12664 & 8568 & 1080 & 25401 & 425 & 13801 & 17064 \\ 24568 & 11752 & 5624 & 24121 & 7369 & 3081 & 10217 & 19176 \\ 30936 & 5064 & 29289 & 19545 & 2217 & 19418 & 8441 & 19368 \\ 25496 & 1608 & 10617 & 30938 & 28922 & 16218 & 4857 & 16600 \\ 22840 & 22217 & 4377 & 2713 & 201 & 32570 & 10889 & 19816 \\ 6776 & 10889 & 5257 & 5113 & 4857 & 8009 & 26905 & 2007 \\ 20024 & 26809 & 28473 & 216 & 1176 & 15608 & 1335 & 2022 \end{bmatrix}$$

Each entry in the table above is computed as $(M-2048) \times 16 + E$.

Figure 3:
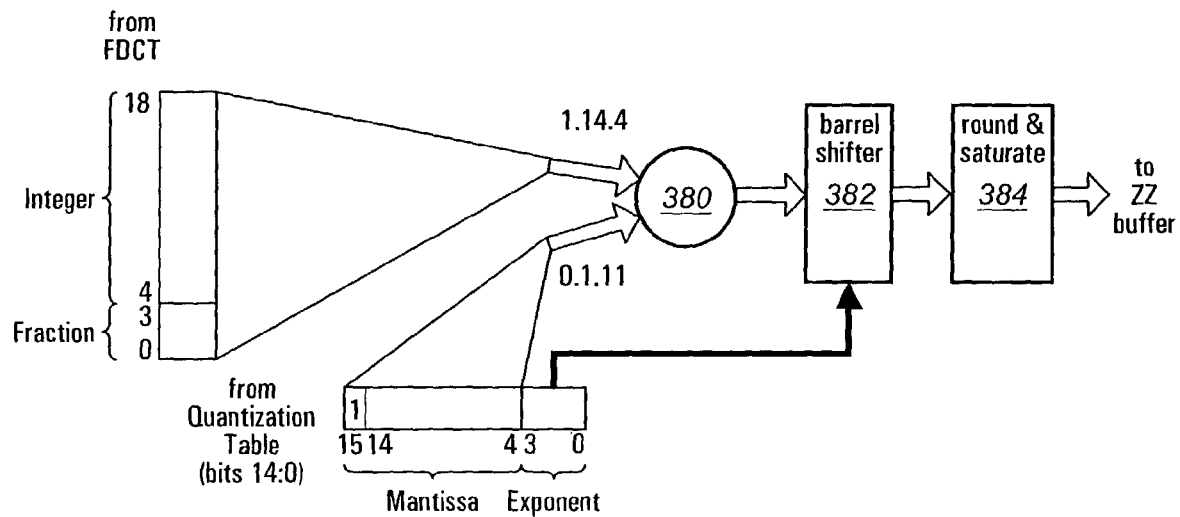
FIG. 3 shows one embodiment of a quantizer arithmetic unit.

FIG. 3 depicts a floating point quantization arithmetic unit. The floating point unit receives data from the FDST engine and scaling-coefficients in floating point format. Labels of the form s.i.f indicate a fixed-point format s bits, i bits and f bits allocated for sign, integer part and fraction part, respectively. FQT outputs are signed quantities, and may be 12 bits long for DC coefficients, and may be as long as 11 bits for AC coefficients. The FDST data is multiplied with the scaling coefficients using a floating point multiplier 380. The output of the floating point multiplier 380 is provided to a barrel shifter 382, which in turn drives a round/saturate unit 384. Proper saturation ensures no values are outside those ranges, which may occur due to rounding in FDCT and FQT operations.

The DCT process 300 transforms a signal from a spatial representation into a frequency representation. Lower frequencies contribute more to an image than higher frequencies; thus, when an image is transformed into its frequency components, much of the higher frequency data may be discarded so as to reduce the amount of data needed to describe the image without a noticeable sacrifice in image quality. The DCT is a separable transform that enables the computation of a two-dimensional transform using a sequence of one-dimensional transforms. The two-dimensional transform of an 8×8 pixel block is accomplished by a number of one-dimensional transforms. First, each row is transformed using a one-dimensional (8-point) DCT. The results are then stored in consecutive rows of an 8×8 storage array. The one dimensional transform is applied to each array column. Results are stored in consecutive columns of the output array, which then contains the resulting two-dimensional transform.

Figure 4:
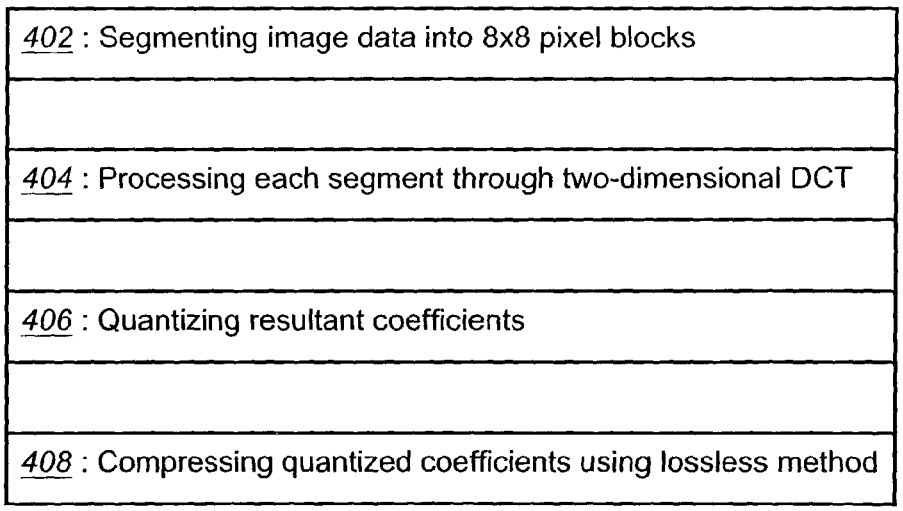
FIG. 4 shows a JPEG compressor with the fast DCT of FIG. 2A.

FIG. 4 illustrates a simplified JPEG compressor method 400 that incorporates the above-described DCT method. The process 400 first segments image data into 8×8 pixel blocks (402). In 410, image data is subdivided into smaller, two-dimensional segments, in the present example, symmetrical 8×8 pixel blocks. Next, the process 400 processes each segment through the FDCT of FIG. 2A (404). Each of the 8×8 pixel blocks created in step 410 is processed through a two-dimensional discrete cosine transform independent of its neighboring blocks. Next, the resultant coefficients are quantized (406). Data gathered in 420 can be reduced to concentrate the important information into a few coefficients, leaving the remaining coefficients equal to zero, or otherwise "insignificant." This is performed in JPEG by dividing the coefficients previously produced by a quantization matrix. Unimportant information is discarded to reduce the size of the file. The process 400 then compresses quantized coefficients using lossless method (408). Any number of standard lossless compression methods, such as RLE, Huffman, arithmetic coding for example, can be used to compress the quantized coefficients.

In one embodiment, following quantization, 8×8 blocks are zigzag reordered into 1-dimensional vectors of 64 elements. The quantization process normally generates several zero value coefficients within each block. Zigzag reordering is meant to maximize the number of consecutive zeros occurring in the 64-element vector. Run-length codes comprise of (run, length, value) triplets. The first triplet element is the number of consecutive zeros preceding a non-zero vector element. The second triplet element is the minimum number of bits required to represent the non-zero vector element. In case of positive values, length and value are determined by simply eliminating leading 0-bits. In case of negative values, first the incoming value is decremented ($-1 \rightarrow -2$, for example); then, length and value are determined by eliminating leading 1-bits from the decremented value. The resulting value msb is 1 (0) for positive (negative) elements. For DC components ($1^{st}$ element in the vector), a differential value is computed by subtracting the previous DC value (predictor) of corresponding color component type (luma, chroma-b, chroma-r). Predictors are then updated with current DC value. This is done prior to run-length coding. Moreover, in case of DC components run is always set to zero, even if the differential DC value is zero.

Four Huffman tables are defined in the JPEG standard—one for Luma DC coefficients; one for Chroma DC coefficients; one for Luma AC coefficients; and one for Chroma AC coefficients. In general, those tables can be programmable, however, current MQJPEG implementation does not support programmable Huffman tables. Table look-up addresses are obtained from run-length triplets produced as described above. Run and length triplet elements are paired together to form table addresses. Special care must be taken in case run is greater then 15. A unique Huffman code is available to handle cases of 16 or more consecutive zeros. Special handling is necessary at the end of each coded block. EOB (end of block) code is appended after the last Huffman coded run-length is output, if the last non-zero coefficient is not the $64^{th}$ vector element. For DC components the run is always zero and length range is [0,11]. For AC components run range is [0,15] and length range is [0,10]. Since Huffman codes by definition vary in length, tables must store both the length of the code (in bits) and the code itself.

A scan is composed of back-to-back Huffman coded blocks. Huffman codes are output in most-significant-bit-first order; bytes are filled starting at the most significant bit. In this implementation, consecutive bytes are written into embedded SRAM in little-endian order. A software flush command may be used to flush incomplete bytes/words to memory. Hardware maintains a byte counter to indicate the total number of bytes written to memory. The flush command updates this counter as well. In addition, a 3-bit counter is maintained to indicate the number of valid bits in the last byte written into memory (0 means all bits are good) in this embodiment. Software uses this bit counter to pad the last byte with 1-bits, as required. Following flushing and padding, software copies the scan to system memory, adding marker escape bytes (0x00) following any incoming 0xFF bytes. If required, appropriate headers are also inserted before and after the scan, to comply with JPEG interchange format.

Figure 5:
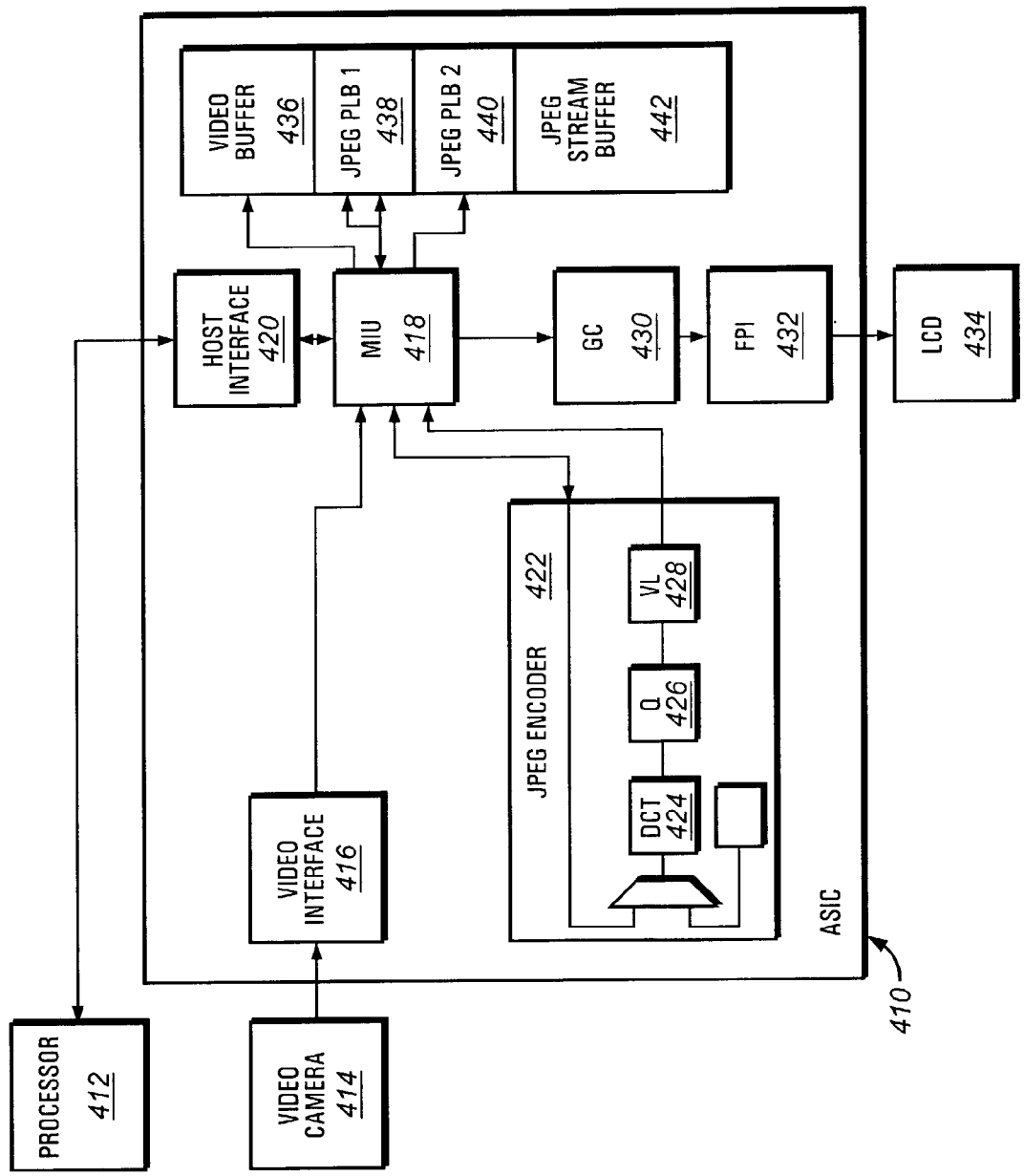
FIG. 5 shows a system implementing the fast DCT of FIG. 2A.

FIG. 5 illustrates a system for the real-time image capture/compression/display process within a hand-held device such as a PDA or a cellular phone that takes advantage of the performance characteristics of FIG. 2A. The system architecture includes a liquid crystal display (LCD) 434, a processor 412 that interfaces with application-specific integrated circuit (ASIC) 450, and a video camera 414 that also interfaces with ASIC 410.

The video camera 414 can be a charge coupled device (CCD) which captures images associated with the pictures. The analog information can be encoded by the transmitter in analog form and transmitted. Alternatively, the transmission can be digital where a suitable analog to digital converter (ADC) receives and digitally converts the analog video information from the CCD. Suitable actuators can be provided to physically control camera settings. For example, a lens opening control unit can be provided to adjust light levels to be received by the CCD. Further, a lens focusing unit can be used to automatically focus the images, based on information provided by one of the sensors. Further, the lens may be automatically switched with additional lens to provide different views. Additionally, the lens have one or optional filters to filter lights coming to the lens.

ASIC 450 includes a video interface 456 through which video camera 414 interfaces with ASIC 450, and a host interface 420 through which processor 412 interfaces with ASIC 450. ASIC 450 further includes a memory interface unit (MIU) 458, a graphics controller (GC) 430, and a flat panel interface (FPI) 432 that interfaces with LCD 434.

ASIC 450 also includes embedded buffer memory in the form of a video buffer 436, a processing line buffer 1 (PLB 1) 438 and a second PLB 2 440, and a stream buffer 442. ASIC 410 further includes an encoder 422 (in this case a JPEG encoder) that performs the compression functions described in method 300. JPEG encoder 422 includes modules for a discrete cosine transform (DCT) engine 424, a quantizer (Q) 426, and a Huffman encoder (VL) 428 that losslessly compresses the quantized coefficients.

During operation, the video camera 414 captures video and video frames are sent as packets through a packet network. Each video frame is compressed by encoder 422 such as a JPEG encoder, and the encoded output is received by the MIU 418 and stored in the video buffer 436. The JPEG PLB 1 and PLB 2 438 and 440, respectively, format and store lines of video data in the JPEG stream buffer 442.

A transmitter processor provides the necessary control information so as to form packets. In turn, the JPEG stream buffer packets are transmitted through a network and detected by a receiver that decompresses the decoded video data to produce received frame that is a reproduced version of original video frame.

The above operations are controlled by a processor or an application specific integrated circuit (ASIC). In one embodiment, a processor is embedded and the processor can be a reduced instruction set computer (RISC) processor or a complex instruction set computer (CISC) processor. In one embodiment, the processor is a low power CPU such as the MC68328V DragonBall device available from Motorola Inc. The processor is connected to a read-only-memory (ROM) for receiving executable instructions as well as certain predefined data and variables. The processor is also connected to a random access memory (RAM) for storing various run-time variables and data arrays, among others. The RAM size is sufficient to store user application programs and data. In this instance, the RAM can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM for data back-up purposes.

One embodiment of the system 400 contains functionality for the real-time baseline JPEG compression of video images produced by complimentary metal-oxide semiconductor (CMOS) video sensors up to VGA resolutions (640×480 pixels) at 30 frames per second. Within JPEG encoder 422, the data stream enters DCT 424 in lines of sixteen. The system implements DCT 424 fast enough to enable real-time compression of visual data, as is described in reference to DCT method 300 in FIG. 2, thereby eliminating the need for a frame buffer to hold the entire visual image (freezing the entire frame and subsequently converting). The DCT method is characterized by one fewer computational stage, two fewer unique coefficients, an even distribution of multiply operations across computational stages, and the elimination of the memory-intensive accumulate-multiply operation.

It is to be understood that various terms employed in the description herein are interchangeable. Accordingly, the above description of the invention is illustrative and not limiting. Further modifications will be apparent to one of ordinary skill in the art in light of this disclosure. Thus, although primarily intended to be used in audio-visual environment such as camera-enabled cellular telephones or portable computers and PDAs, this invention is also applicable in any multimedia environment. Examples of such environment include but are not limited to software and games delivery systems, digital books and collaborative creation of documents. Moreover, although the invention has been discussed with reference to JPEG, a variety of different video coding standards, including MPEG-1, MPEG-2, MPEG-4, MPEG-7, H.261, and H.263, can be used as well.

The invention has been described in terms of specific examples which are illustrative only and are not to be construed as limiting. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs) or suitably programmed field programmable gate arrays (FPGAs).

While the preferred forms of the invention have been shown in the drawings and described herein, the invention should not be construed as limited to the specific forms shown and described since variations of the preferred forms will be apparent to those skilled in the art. Thus the scope of the invention is defined by the following claims and their equivalents.

APPENDIX

```
// Copyright (c) 2002, Leonardo Vainsencher
const double Cdct::Pi = acos(-1);
const double Cdct::c1 = CS(2)/CS(6);
const double Cdct::c2 = CS(4);
```

APPENDIX-continued

```
const double Cdct::c3 = CS(6);
const double Cdct::sf[8] = {
        1/CS(4)/4, 1/CS(1)/4, 1/CS(2)/4, 1/CS(3)/4,
        1/CS(4)/4, 1/CS(5)/4, 1/CS(6)/4, 1/CS(7)/4 };
Cdct::Cdct(void)
{
    p1 = c1;
    p2 = c2;
    p3 = c3;
    for (int k=0 ; k < 8 ; k++)
        pf[k] = sf[k];
}
// fwd 1d-dct
void
Cdct::fdct1(const double* xx, double* yy)
{
    fdct1_15(xx,t5);
    scale1(t5,yy);
}
// fwd 1d-dct front stages (1–5)
// excludes scaling stages
void
Cdct::fdct1_15(const double* xx, double* yy)
{
    stage1(xx,t1);
    stage2(t1,t2);
    stage3(t2,t3);
    stage4(t3,t4);
    stage5_ord(t4,yy);
}
// dct stages
void
Cdct::stage1(const double* in, double* out) const
{
    out[0] = in[0] + in[7];
    out[1] = in[1] + in[6];
    out[2] = in[2] + in[5];
    out[3] = in[3] + in[4];
    out[4] = in[4] – in[3];
    out[5] = in[2] – in[5];
    out[6] = in[1] – in[6];
    out[7] = in[0] – in[7];
}
void
Cdct::stage2(const double* in, double* out) const
{
    out[0] = in[0] + in[3];
    out[1] = in[1] + in[2];
    out[2] = in[1] – in[2];
    out[3] = in[0] – in[3];
    out[4] = in[4] – in[5];
    out[5] = in[5] + in[6];
    out[6] = in[6] + in[7];
    out[7] = in[7];
}
void
Cdct::stage3(const double* in, double* out) const
{
    out[0] = in[0] + in[1];
    out[1] = in[0] – in[1];
    out[2] = in[2] + in[3];
    out[3] = in[3];
    out[4] = p1*in[4] + in[6];
    out[5] = p2*in[5];
    out[6] = p1*in[6] – in[4];
    out[7] = in[7];
}
void
Cdct::stage4(const double* in, double* out) const
{
    out[0] = in[0];
    out[1] = in[1];
    out[2] = p2*in[2];
    out[3] = in[3];
    out[4] = p3*in[4];
    out[5] = in[7] + in[5];
    out[6] = p3*in[6];
    out[7] = in[7] – in[5];
}
```

APPENDIX-continued

```
void
Cdct::stage5(const double* in, double* out) const
{
    out[0] = in[0];
    out[1] = in[1];
    out[2] = in[3] + in[2];
    out[3] = in[3] – in[2];
    out[4] = in[7] – in[4];
    out[5] = in[5] + in[6];
    out[6] = in[5] – in[6];
    out[7] = in[7] + in[4];
}
// stage5 with properly ordered output
void
Cdct::stage5_ord(const double* in, double* out) const
{
    double tmp[8];
    stage5(in,tmp);
    out[0] = tmp[0];
    out[1] = tmp[5];
    out[2] = tmp[2];
    out[3] = tmp[7];
    out[4] = tmp[1];
    out[5] = tmp[4];
    out[6] = tmp[3];
    out[7] = tmp[6];
}
void
Cdct::scale1(const double* in, double* out) const
{
    for (int k=0; k < 8; k++)
        out[k] = pf[k]*in[k];
}
```

What is claimed is:

1. A method of processing image data, said method comprising:

performing a discrete cosine transform (DCT) on image data to generate second data, wherein said performing said DCT further comprises performing said DCT using at least one computational stage, wherein said performing said DCT further comprises performing said DCT utilizing a first coefficient, wherein said performing said DCT further comprises performing said DCT utilizing at most three coefficients, and wherein said performing said DCT further comprises performing said DCT using at least one move operation; and scaling said second data to generate third data, wherein said scaling further comprises scaling said second data utilizing a second coefficient.

2. The method of claim 1 further comprising:

quantizing said third data to generate fourth data; and
compressing said fourth data to generate fifth data.

3. The method of claim 2, wherein said compressing said quantized data comprises encoding said quantized data in accordance with a lossless compression technique selected from a group consisting of RLE, Huffman, and arithmetic coding.

4. The method of claim 1 further comprising:

segmenting content into 8×8 pixel blocks to generate said image data.

5. The method of claim 1, wherein each of said at least one computational stage is operable to perform at least one dyadic operation selected from a group consisting of a multiply operation, an add operation, a multiply-accumulate operation, and a move operation.

6. The method of claim 1, wherein said DCT comprises a plurality of multiply operations, wherein said at least one computational stage comprises a plurality of computational stages, and wherein said plurality of multiply operations are distributed across said plurality of computational stages.

7. The method of claim 6, wherein said plurality of computational stages are pipelined.

8. The method of claim 1, wherein said DCT comprises a two-dimensional DCT utilizing at most five computational stages, and wherein said second data generated by said two-dimensional DCT comprises two-dimensional data.

9. The method of claim 1, wherein said image data is selected from a group consisting of video and at least one image.

10. An content encoder comprising:
   a first component operable to perform a discrete cosine transform (DCT) on image data to generate second data, wherein said first component is further operable to perform said DCT using at least one computational stage, wherein said first component is further operable to perform said DCT utilizing a first coefficient, wherein said first component is further operable to perform said DCT utilizing at most three coefficients, and wherein said first component is further operable to perform said DCT using at least one move operation; and
   a second component coupled to said first component, wherein said second component is operable to scale said second data to generate third data.

11. The content encoder of claim 10, wherein said second component is further operable to quantize said third data to generate fourth data, and further comprising:
   a third component operable to compress said fourth data to generate fifth data.

12. The content encoder of claim 11, wherein said third component is further operable to compress said fourth data using a lossless compression technique selected from a group consisting of RLE, Huffman, and arithmetic coding.

13. The content encoder of claim 10, wherein each of said at least one computational stage is operable to perform at least one dyadic operation selected from a group consisting of a multiply operation, an add operation, a multiply-accumulate operation, and a move operation.

14. The content encoder of claim 10, wherein said first component is further operable to perform a plurality of multiply operations, wherein said at least one computational stage comprises a plurality of computational stages, and wherein said plurality of multiply operations are distributed across said plurality of computational stages.

15. The content encoder of claim 10, wherein said plurality of computational stages are pipelined.

16. The content encoder of claim 10, wherein said first component is further operable to perform a two-dimensional DCT utilizing at most five computational stages, and wherein said second data generated as a result of said two-dimensional DCT comprises two-dimensional data.

17. The content encoder of claim 10, wherein said image data is selected from a group consisting of video and at least one image.

18. A system comprising:
   a processor;
   a memory coupled to said processor; and
   a content encoder coupled to said processor, wherein said content encoder comprises:
      a first component operable to perform a discrete cosine transform (DCT) on image data to generate second data, wherein said first component is further operable to perform said DCT using at least one computational stage, wherein said first component is further operable to perform said DCT utilizing a first coefficient, wherein said first component is further operable to perform said DCT utilizing at most three coefficients, and wherein said first component is further operable to perform said DCT using at least one move operation; and
      a second component coupled to said first component, wherein said second component is operable to scale said second data to generate third data.

19. The system of claim 18, wherein said second component is further operable to quantize said third data to generate fourth data, and wherein said content encoder further comprises:
   a third component operable to compress said fourth data to generate fifth data.

20. The system of claim 19, wherein said third component is further operable to compress said fourth data using a lossless compression technique selected from a group consisting of RLE, Huffman, and arithmetic coding.

21. The system of claim 18, wherein each of said at least one computational stage is operable to perform at least one dyadic operation selected from a group consisting of a multiply operation, an add operation, a multiply-accumulate operation, and a move operation.

22. The system of claim 18, wherein said first component is further operable to perform a plurality of multiply operations, wherein said at least one computational stage comprises a plurality of computational stages, and wherein said plurality of multiply operations are distributed across said plurality of computational stages.

23. The system of claim 18, wherein said plurality of computational stages are pipelined.

24. The system of claim 18, wherein said first component is further operable to perform a two-dimensional DCT utilizing at most five computational stages, and wherein said second data generated as a result of said two-dimensional DCT comprises two-dimensional data.

25. The system of claim 18, wherein said image data is selected from a group consisting of video and at least one image.

* * * * *